United States Patent
O'Dowd

(10) Patent No.: US 12,103,238 B1
(45) Date of Patent: Oct. 1, 2024

(54) FRINGE CALIBRATION SYSTEM AND METHOD

(71) Applicant: Additive Monitoring, Inc., Chicago, IL (US)

(72) Inventor: Niall O'Dowd, Chicago, IL (US)

(73) Assignee: Additive Monitoring, Inc., Chicago, IL (US)

( * ) Notice: Subject to any disclaimer, the term of this patent is extended or adjusted under 35 U.S.C. 154(b) by 0 days.

(21) Appl. No.: 18/440,733

(22) Filed: Feb. 13, 2024

(51) Int. Cl.
- *B29C 64/393* (2017.01)
- *G01B 11/25* (2006.01)
- *B33Y 50/00* (2015.01)

(52) U.S. Cl.
CPC ........ B29C 64/393 (2017.08); G01B 11/2504 (2013.01); *B33Y 50/00* (2014.12)

(58) Field of Classification Search
CPC .... B29C 64/393; G01B 11/2504; B33Y 50/00
See application file for complete search history.

(56) References Cited

U.S. PATENT DOCUMENTS

| | | | | |
|---|---|---|---|---|
| 5,623,561 A | * | 4/1997 | Hartman | G01N 21/7703 385/12 |
| 2006/0086193 A1 | * | 4/2006 | Ueki | G03F 7/70783 73/856 |
| 2007/0201035 A1 | * | 8/2007 | Dresel | G01B 11/2441 356/512 |
| 2021/0187861 A1 | * | 6/2021 | Zeulner | B22F 10/31 |
| 2022/0105567 A1 | * | 4/2022 | Ljungblad | B23K 15/0033 |
| 2022/0404276 A1 | * | 12/2022 | O'Dowd | G01N 21/8806 |
| 2023/0168081 A1 | * | 6/2023 | Gu | G06T 7/85 356/603 |
| 2023/0249253 A1 | * | 8/2023 | O'Dowd | B22F 10/85 700/98 |

FOREIGN PATENT DOCUMENTS

CN 113959360 * 1/2022

* cited by examiner

*Primary Examiner* — Santosh R Poudel
(74) *Attorney, Agent, or Firm* — Fresh IP PLC; John R. Bednarz

(57) ABSTRACT

A system includes an additive manufacturing machine having a reference surface and an object surface, at least one camera device to capture the reference surface, at least one projector device to project at the reference surface, a memory storing computer-readable instructions, and at least one processor to execute the instructions to move the reference surface above or below a highest point the object surface, and move the reference surface downward and obtain a digital fringe projection phasemap of the reference surface using the at least one camera device and the at least one projector device until a whole measurement volume has phasemap data.

19 Claims, 10 Drawing Sheets

FRINGE CALIBRATION SYSTEM AND METHOD

The invention described herein was made with U.S. government ("Government") support under Contract No. FA864922P0933, awarded by the U.S. Air Force. As a result, the Government has certain rights in this invention.

BACKGROUND

Additive manufacturing can create complex and high performing parts, but determining part quality, conformance, and performance is very difficult. Often times, assessing part quality in a post-inspection manner can be costly and timely, so methods to assess part quality in real time are valuable. Post-inspection technologies aimed to find defects in additive manufacturing are timely, expensive, and inaccurate when inspecting large parts, which create more challenges with quality assurance.

Real-time or "in situ" inspection (e.g., inspecting the additive manufacturing part as it is printed) can be more cost effective, efficient, and accurate than inspecting the part after it is manufactured. However, some approaches such as image analysis, temperature monitoring, humidity monitoring, and thermal monitoring are unable to accurately and efficiently determine whether there are defects in realtime. Additionally, these conventional approaches generate vast amounts of data that waste storage space and present computational tasks that are very difficult to efficiently perform that waste processor cycles and time.

Height mapping technology, such as digital fringe projection, electronic speckle interferometry, phase profilometry, touch probes, and others can find defects during the printing process, but the calibration method to establish good measurement is difficult.

It is with these issues in mind, among others, that various aspects of the disclosure were conceived.

SUMMARY

According to one aspect, a fringe calibration system and method is provided to use a single frequency, e.g., pitch, fringe projection sequence to obtain objective height information. Conventionally, a multi-frequency, e.g., pitch digital fringe projection sequence was used to obtain height information resulting in more fringe images that are time consuming to obtain and difficult to efficiently store. The fringe calibration system calibrates a height mapping technique and is able to perform calibration on one of a powder surface, a melted surface, a binded surface, a slurry surface, a baseplate, and a calibration plate, among others.

In one example, a system may include an additive manufacturing machine having a reference surface and an object surface, at least one camera device to capture the reference surface, at least one projector device to project at the reference surface, a memory storing computer-readable instructions, and at least one processor to execute the instructions to move the reference surface above or below a highest point of the object surface, and move the reference surface and obtain a digital fringe projection phasemap of the reference surface using the at least one camera device and the at least one projector device until a whole measurement volume has phasemap data.

In another example, a method may include capturing a reference surface of an additive manufacturing machine by at least one camera device, using at least one projector device to project at the reference surface of the additive manufacturing machine, moving, by at least one processor, the reference surface above or below a highest point of an object surface of the additive manufacturing machine, and moving, by the at least one processor, the reference surface and obtaining a digital fringe projection phasemap of the reference surface using the at least one camera device and the at least one projector device until a whole measurement volume has phasemap data.

In another example, a non-transitory computer-readable storage medium may have instructions stored thereon that, when executed by at least one computing device cause the computing device to perform operations, the operations including capturing a reference surface of an additive manufacturing machine by at least one camera device, using at least one projector device to project at the reference surface of the additive manufacturing machine, moving the reference surface above or below a highest point of an object surface of the additive manufacturing machine, and moving the reference surface and obtaining a digital fringe projection phasemap of the reference surface using the at least one camera device and the at least one projector device until a measurement volume has phasemap data.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
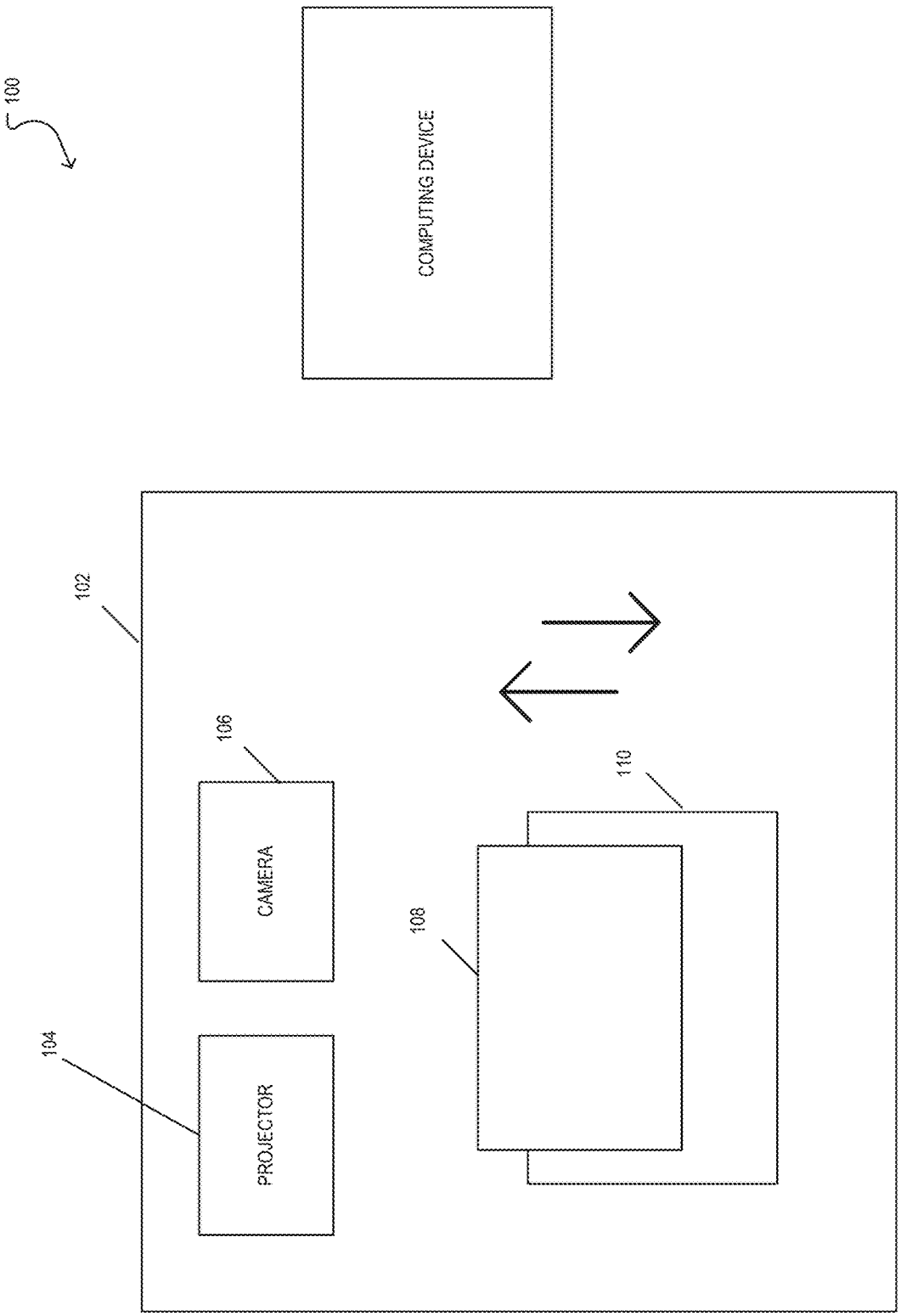
FIG. 1 is a block diagram of fringe calibration system according to an example of the instant disclosure.

The present disclosure is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present disclosure, as the disclosure encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

A fringe calibration system and method is discussed herein that uses a single frequency, e.g., pitch, fringe projection sequence to obtain objective height information. Conventionally, a multi-frequency, e.g., pitch digital fringe projection sequence was used to obtain height information resulting in more fringe images that are time consuming to obtain and difficult to efficiently store.

Additive manufacturing has conventionally used visual inspection such as human visual inspection that includes people viewing through windows of three-dimensional (3D) printers to look for visual indications of defects that may occur in a powder bed chamber of a printer.

There are some commercially available in-situ monitoring systems. One is a melt pool monitoring system produced by EOS that uses photodiodes in an optical path to measure "temperature" of a melt pool. However, the conventional approach struggles to extract useful information and it produces a very large amount of data (e.g., terabytes of data). The data is not very useful and this system is limited to use only by EOS 3D printers. Additionally, it does not work across different makes and models of printers.

Another monitoring system is a melt pool monitoring system, but this conventional approach uses a warranty-voiding integration of objects into a beamline of the printer. This retrofit is also not a good solution because it results in a very large amount of data that is too large to process in realtime.

Visual inspection can evaluate health of a printing process or detect defects but relies on subjective human opinions, only can be applied to a current layer, uses costly labor to observe a build, and defects can be missed if a person such as a technician is not observing the process. Disadvantages of current in-process monitoring melt pool analysis techniques include the high financial cost, the failure to provide actionable realtime information, expert knowledge is required, large datasets are generated, the monitoring is not realtime, and in some situations conventional solutions void warranties of printers.

A fringe calibration system comprises a structured light monitoring system to detect defects in an additive manufacturing process. The system may use structured light monitoring measurements and information to determine a statistical likelihood of a defect to occur. Additive manufacturing (AM) systems are commonly referred to as 3D printers and add layers of build material that is subsequently solidified. As layers are added, defects can occur in a final product.

The fringe calibration system spatially encodes a unique phase value for a unidirectional datum for each surface of measurement. This can be accomplished by projecting predefined patterns onto a measurement surface, which can be a build plate, powder layer, melted layer, binded layer, or sintered layer, among others. With phase values encoded onto a surface of measurement, process anomalies during a printing process can be detected. Anomalies during the printing process may include and/or be related to recoater cross section information, build surface skew, plate skew, build plate flatness, build plate vibration, build plate vertical accuracy, powder coating thickness, powder coating roughness, powder coating streaking, powder coating hopping, powder coating short feeds, powder coating clumps, powder coating agglomerations, changes in powder coating after melting or solidification or binding, non-uniform powder particles, thermal deformation, over melting, under melting, component protrusions, absolute layer height from a reference, material disintegration, support structure strain, overall strain, surface strain, particle splitting, particle aggregation, particle agglomeration, uneven melting, uneven sintering, laser spacing effects, laser spot size, laser power, binder ballistic effect, binder powder interaction, binder deposition height solidification, or others that shift an encoded spatial phase from a reference plane that may be measured or mathematical.

The features above may be apparent in spatially encoded phase data or extracted using a match filter. The features may be extracted using kernel convolutional techniques, absolute phase difference measurement Separable Convolution, Dilated convolution, Atrous Convolution, Deformable convolution, demodulation, Fourier transformations, Hilbert transformations, Gaussian filtering, flat box filtering, Sobel filters, Sobel operators, Sobel-Fieldman operators, Prewitt operators, and Laplacian operators, among others.

In addition to generating spatial phase encoded surface maps, the system can generate height maps. The system may generate a height map of a powder bed chamber, which determines the height of each deposited powder layer and/or solidified layer, classifies the height maps as in-spec or out-of-spec, and provides an alert when there may be a height anomaly.

The system may include hardware devices and at least one computing device that operably couples to many types of 3D printers, e.g., additive manufacturing printers, to provide measurements of exposed surfaces of parts and feedstock material in realtime. Using height measurements separate from phase measurements, process anomalies during a printing process can be detected. Anomalies during the printing process may include or be related to recoater cross sectional information, build surface skew, plate skew, build plate flatness, build plate vibration, build plate vertical accuracy, powder coating thickness, powder coating roughness, powder coating streaking, powder coating hopping, powder coating short feeds, powder coating clumps, powder coating agglomerations, changes in powder coating after melting or solidification or binding, non-uniform powder particles, thermal deformation, over melting, under melting, component protrusions, absolute layer height from a reference, material disintegration, support structure strain, overall strain, surface strain, particle splitting, particle aggregation, particle agglomeration, uneven melting, uneven sintering, laser spacing effects, laser spot size, laser power, binder ballistic effect, binder powder interaction, binder deposition height solidification, any other physical phenomena that shift the encoded spatial phase from a reference plan either measured or mathematical.

The features may be apparent in height data or extracted using a match filter. The features may be extracted using kernel convolutional techniques, absolute height difference measurement, Separable Convolution, Dilated convolution, Atrous Convolution, Deformable convolution, demodulation, Fourier transformations, Hilbert transformations, Gaussian filtering, flat box filtering, Sobel operators, Sobel-Fieldman operators, Prewitt operators, or Laplacian operators, among others.

The system may generate a spatially encoded unique phase value for each pixel on a measurement area. Areas of phase that are not uniform may include a process anomaly during 3D printing. The system also may generate height maps. The height maps of exposed surfaces may be used to detect height anomalies in feedstock material layer (depressions or clumps) that can contribute to final part failures and a newly solidified layer, which can contribute to final part defects and/or damage to the printer.

The system may include hardware devices and software executed by at least one computing device that can be coupled to numerous 3D printers, e.g., additive manufacturing printers, to provide measurements of exposed surface of parts and feedstock material in realtime. The system generates a spatially encoded phase value for each pixel on a measurement area. The hardware devices may include a structured light system such as digital fringe projection (DFP). DFP may include one or more projectors, one or more camera devices, and at least one computing device by timing, triggering, and data collection that controls and performs mathematical operations on images captured by the camera devices. DFP determines 3D measurements by projecting patterns onto a part that is being generated or printed as well as a feedstock material surface, records pattern deformation, and spatially encodes phase onto the surface while determining a height map that represents a 3D surface of measurement. The height map can reveal many different types of in-situ defects that can cause a whole-part rejection downstream. The in-situ defects may include warping, over-melting, under-melting, thermal deformation, lack-of-fusion, recoater blade hopping, powder streaks, powder depressions, and part protrusions, among others. The system can determine an impact of in-situ detected defects on final part quality and make decisions.

Detected defects can be compared to a library of 3D prints where similar defects were determined and have led to final-part defects to provide an estimate of how likely there may be a final-part defect.

The system may have the DFP monitoring system and can be used for Powder Bed Fusion (PDF), Binder Jetting (BJ), or Selective Laser Sintering (SLS) polymer Additive Manufacturing (AM), among others. The system can be used for DFP height measurements and can be used to provide an indication of uncertainty associated with other types of optical or light based measurement technologies such as digital image correlation technology, contact scanner technology, coherent light imaging technology, and others.

The system can geometrically measure layer heights before and after solidification to detect warping, powder bed defects, lack of fusion, and delamination, among others. When patterns are projected onto a part surface before and after lasing, 3D height maps can be determined based on pattern deformation. The system determines a modular spatial measurement density such that each pixel is a height measurement and provides micron level resolution in the height feature.

The system provides actionable information in realtime and stores the height map of each layer to detect defects without storing an exorbitant amount of data or requiring robust analysis thereby saving storage space and providing computational efficiency. The system can measure different features including height maps of powder bed and melted layer to provide estimations of part quality in realtime to provide go/no-go decisions.

The system is able to determine accuracy of each point of measurement by using previous data regarding final part defects to estimate an existence of internal defects based on in-situ topography by operably coupling to printers via a mounting mechanism, using a neutral density filter on the one or more camera devices, and using a computing device to filter images before creating a phase map that can be converted to topography, and estimating part density based on phase or topography information.

The system is associated with fringe calibration and can be used to calibrate a fringe projection inspection system. The fringe calibration may include physical steps and processing by at least one computing device that together obtain a phase to height calibration matrix. As an example, the fringe calibration may include physical steps including placing a calibration plate at a height of a to be measured surface. Next, at least one camera device may be focused on the calibration plate. Next, at least one projector may be focused on the calibration plate. The calibration plate may be raised above or below the to be printed surface. A digital fringe projection phasemap measurement may be obtained. The calibration plate may move to the be printed surface until a full measurement volume is obtained. Next, the computing device may perform software calibration.

The fringe calibration improves on conventional solutions by allowing a single frequency (or pitch) projection sequence to obtain objective height information. Conventionally, a multi-frequency (or pitch) digital fringe projection sequence was used to obtain objective height information, resulting in more fringe images that was time consuming to obtain.

As a result, the fringe projection can be used to obtain heightmaps having high accuracy in a minimal amount of time allowing for use to inspect manufacturing processes.

In one example, a system may include an additive manufacturing machine having a reference surface and an object surface, at least one camera device to capture the reference surface, at least one projector device to project at the reference surface, a memory storing computer-readable instructions, and at least one processor to execute the instructions to move the reference surface above or below a highest point of the object surface, and move the reference surface and obtain a digital fringe projection phasemap of the reference surface using the at least one camera device and the at least one projector device until a whole measurement volume has phasemap data.

FIG. 1 is a block diagram of a fringe calibration system 100 according to an example of the instant disclosure. The fringe calibration system 100 may be attached to an inside and/or an outside of an additive manufacturing machine chamber 102 as shown in FIG. 1. A computing device may also be used to perform the fringe calibration. The fringe calibration system 100 may have one or more projector devices 104 and one or more camera devices 106 that capture images. The one or more projector devices 104 may provide different projections that may be overlayed simultaneously with different fringe wavelengths. A wavelength of the light projected may be changed during or before projection. Each of the projector devices 104 may have one or more light sources and may be placed in certain locations both within and outside of the additive manufacturing machine chamber 102. Additionally, the one or more camera devices 106 may be placed within and outside of the additive manufacturing machine chamber 102. There also may be one or more interferometers. Each camera device 106 may have one or more image sensors to image structured light such as a fringe that is projected onto a surface of an object to be measured or being measured. A camera device position may be kept constant at a viewing angle. The fringe calibration system 100 may trigger camera image acquisition to capture fringe images at uniform intervals to eliminate projector draw lines that can occur without synchronization.

DFP height measurements can be made by projecting patterns onto a flat reference plane (physical or mathematical) and then placing an object onto the scene and obtaining information associated with how projected patterns deform from a shape of the object. Resultant calculations of deformation of fringe patterns can produce a phase map, which can be converted into a height map through a calibration routine. During in-situ measurements, a reference surface can be taken to be a bare base plate or a base plate with an uniform initial powder coat. If DFP geometries are expected to stay constant, a reference phase map can be mathematically produced to allow differential height measurements independent of any height profile of a reference surface.

In one example, a reference surface 110 such as a calibration plate may be placed at a height or a highest point of an object surface 108. The at least one camera device 106 may be focused on the reference surface 110. Additionally, the at least one projector 104 may be focused on the reference surface 110. In one example, the at least one projector device 104 may have a flexible light steering device with brightness and resolution for industrial applications such as additive manufacturing. The at least one camera device 106 may be a BASLER Ace acA4600 GigE camera or another camera device that may be used for industrial applications such as additive manufacturing.

The reference surface 110 may be raised above an initial height of the object surface 108. A digital fringe projection phasemap measurement of the reference surface 110 may be obtained by a computing device. The reference surface 110 may be moved downward or in another direction such as upward. The digital fringe projection phasemap measurement of the calibration plate may be obtained as the reference surface 110 moves until a whole measurement volume is obtained having phase measurement values. The whole measurement volume may have phasemap data. As an example, the reference surface 110 may be at least one of a powder surface, a melted surface, a binded surface, a slurry surface, a baseplate, and a calibration plate, among others. In addition, as an example, the object surface 108 may be at least one of a powder surface, a melted surface, a binded surface, a slurry surface, a baseplate, and a calibration plate, among others.

In one example, at least one of focus, aperture, exposure, gain, and brightness is tuned for the at least one camera device 106 and the at least one projector device 104. When performing the fringe calibration by the system 100, this may include preheating a printing volume of the additive manufacturing machine chamber 102 to a temperature and a pressure first before the measurement volume is obtained.

Figure 2:
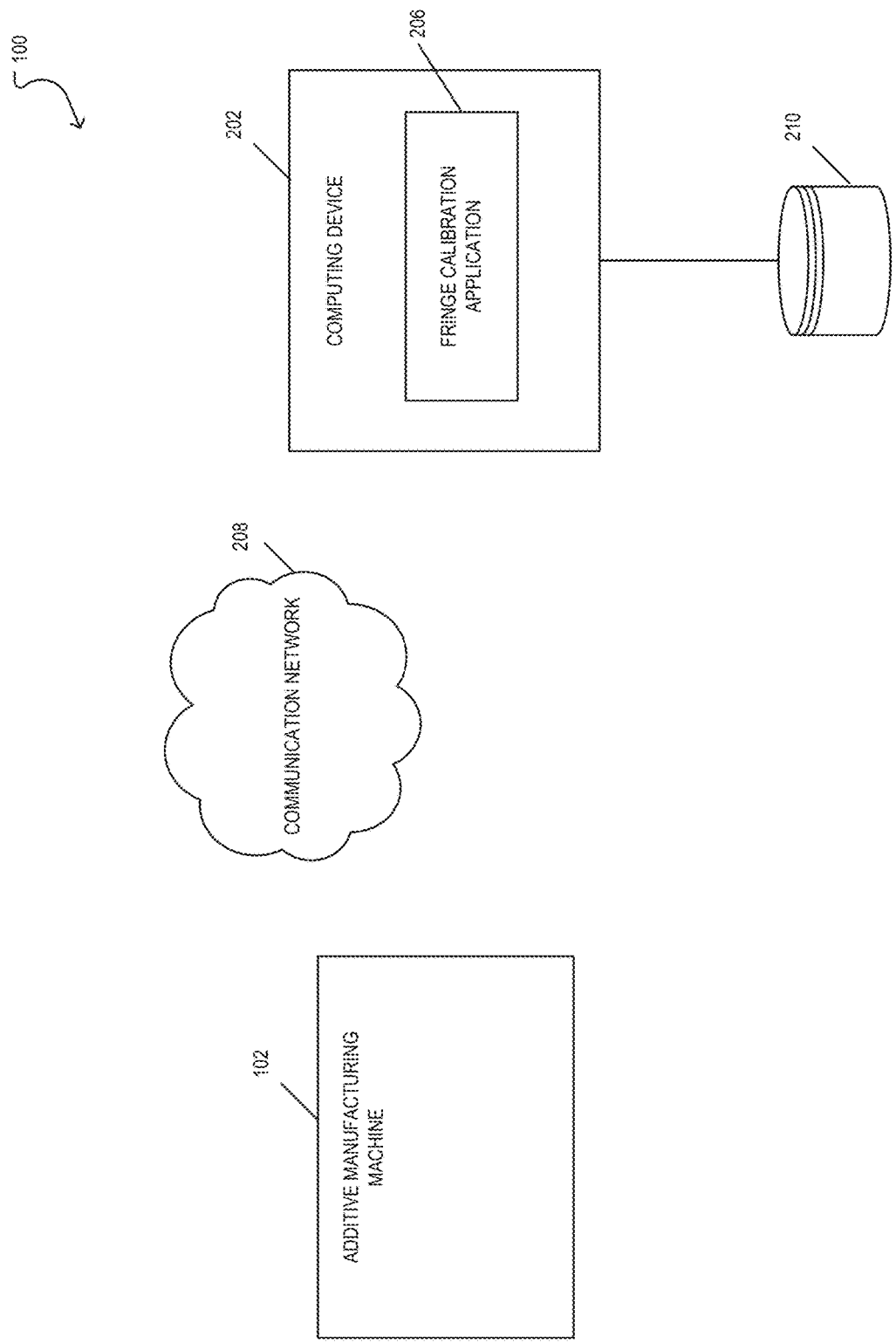
FIG. 2 is a block diagram of the fringe calibration system according to an example of the instant disclosure.

FIG. 2 is another block diagram of the fringe calibration system 100 according to an example of the instant disclosure. As shown in FIG. 2, the system 100 may include the additive manufacturing machine chamber 102 and least one computing device 202. The at least one computing device 202 may be in communication with at least one database 210.

The at least one computing device 202 may be configured to receive data from and/or transmit data through a communication network 208. Although the computing device 202 is shown as a single computing device, it is contemplated each computing device may include multiple computing devices.

The communication network 208 can be the Internet, an intranet, or another wired or wireless communication network. For example, the communication network 208 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The computing device 202 may have a fringe calibration application 206 that may be a component of an application and/or service executable by the at least one computing device 202. For example, the fringe calibration application 206 may be a single unit of deployable executable code or a plurality of units of deployable executable code. According to one aspect, the fringe calibration application 206 may include one component that may be a web application, a native application, and/or an application (e.g., an app) downloaded from a digital distribution application platform that allows users to browse and download applications developed with software development kits (SDKs) including the APPLE® iOS App Store and GOOGLE PLAY®, among others.

The fringe calibration system 200 also may include one or more data sources that store and communicate data from at least one database 210. As an example, the data stored in the at least one database 210 may be fringe projection phasemap measurement information such as measurement volume information including phasemap data.

The computing device 202 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the computing device 202 further includes at least one communications interface to transmit and receive communications, messages, and/or signals.

The computing device 202 could be a programmable logic controller, a programmable controller, a laptop computer, a smartphone, a personal digital assistant, a tablet computer, a standard personal computer, or another processing device. The computing device 202 may include a display, such as a computer monitor, for displaying data and/or graphical user interfaces. The computing device 202 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

In one example, the computing device 202 is located on premises at the location. As another example, the computing device 202 comprises a cloud computing device. In some examples, there may be at least one of a computing device 202 located on premises and a cloud computing device.

As an example, the computing device 202 communicates data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the computing device 202) may send a request message that is a REST and/or a SOAP request formatted using JavaScript Object Notation (JSON) and/or Extensible Markup Language (XML). In response to the request message, a second computer (e.g., a server computing device) may transmit a REST and/or SOAP response formatted using JSON and/or XML.

Figure 3:
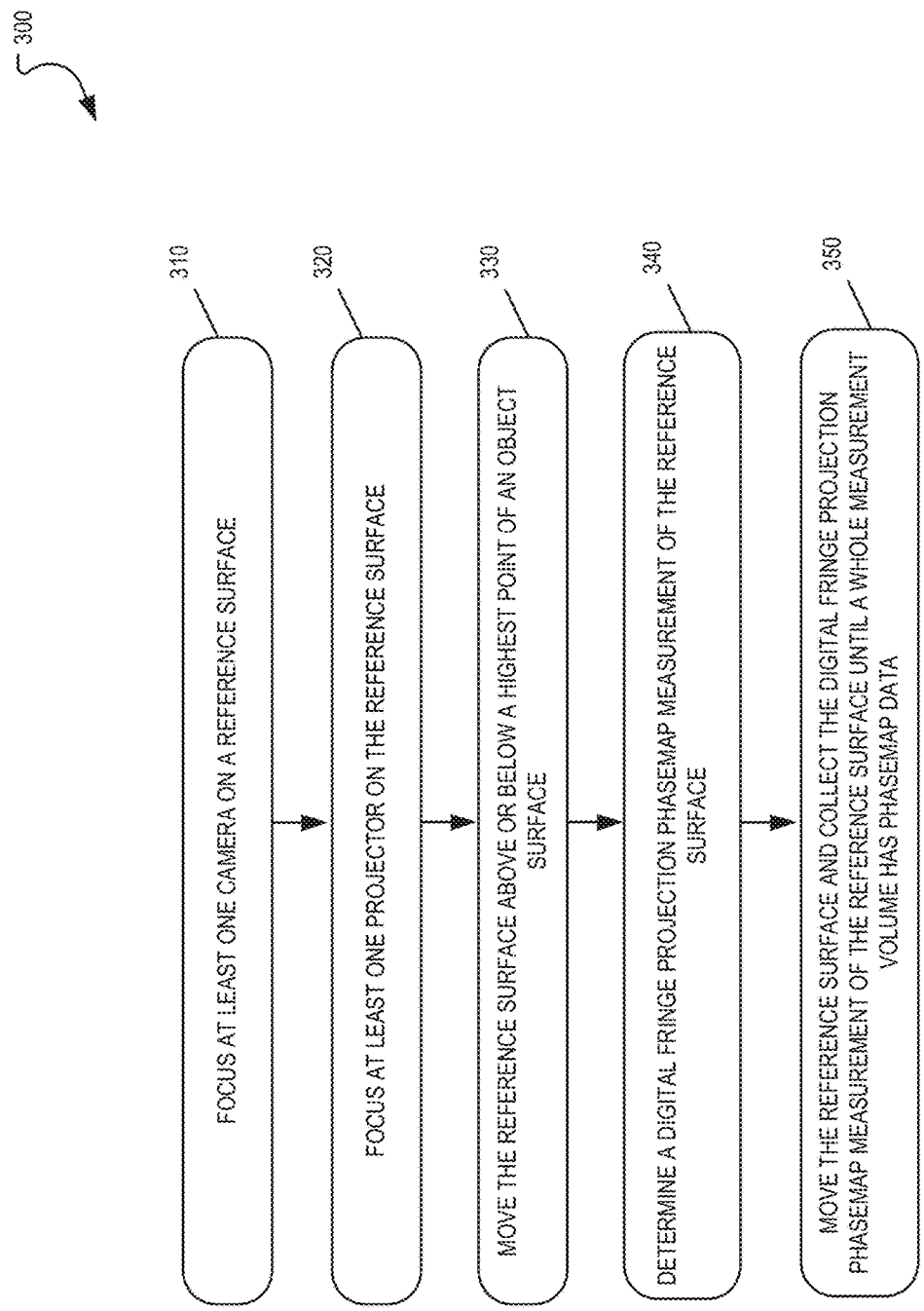
FIG. 3 is a flowchart of a process for physical calibration by the fringe calibration system according to an example of the instant disclosure.

FIG. 3 illustrates an example method 300 for physical calibration by the fringe calibration system 100 according to an example of the instant disclosure. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes focusing at least one camera device 106 on a reference surface 110 of an additive manufacturing machine at block 310. This may include the at least one camera device 106 capturing the reference surface 110. As an example, the reference surface 110 may be least one of a powder surface, a melted surface, a binded surface, a slurry surface, a baseplate, and a calibration plate, among others.

According to some examples, the method 300 includes focusing at least one projector device 104 on the reference surface 110 at block 320. This may include using the at least one projector device 104 to project at the reference surface 110. As an example, at least one of focus, aperture, exposure, gain, and brightness may be tuned for the at least one camera device 106 and the at least one projector device 104.

According to some examples, the method 300 includes moving the reference surface above or below a highest point of an object surface 108 of the additive manufacturing machine at block 330. As an example, the object surface 108 may be at least one of a powder surface, a melted surface, a binded surface, a slurry surface, a baseplate, and a calibration plate, among others.

According to some examples, the method 300 includes determining a digital fringe projection phasemap measurement of the reference surface 110 at block 340.

According to some examples, the method 300 includes moving the reference surface 110 and obtaining the digital fringe projection phasemap of the calibration plate until a whole measurement volume has phasemap data at block 350.

According to some examples, the method 300 may include preheating a printing volume of the additive manufacturing machine to a temperature and a pressure before the measurement volume is obtained.

Figure 4:
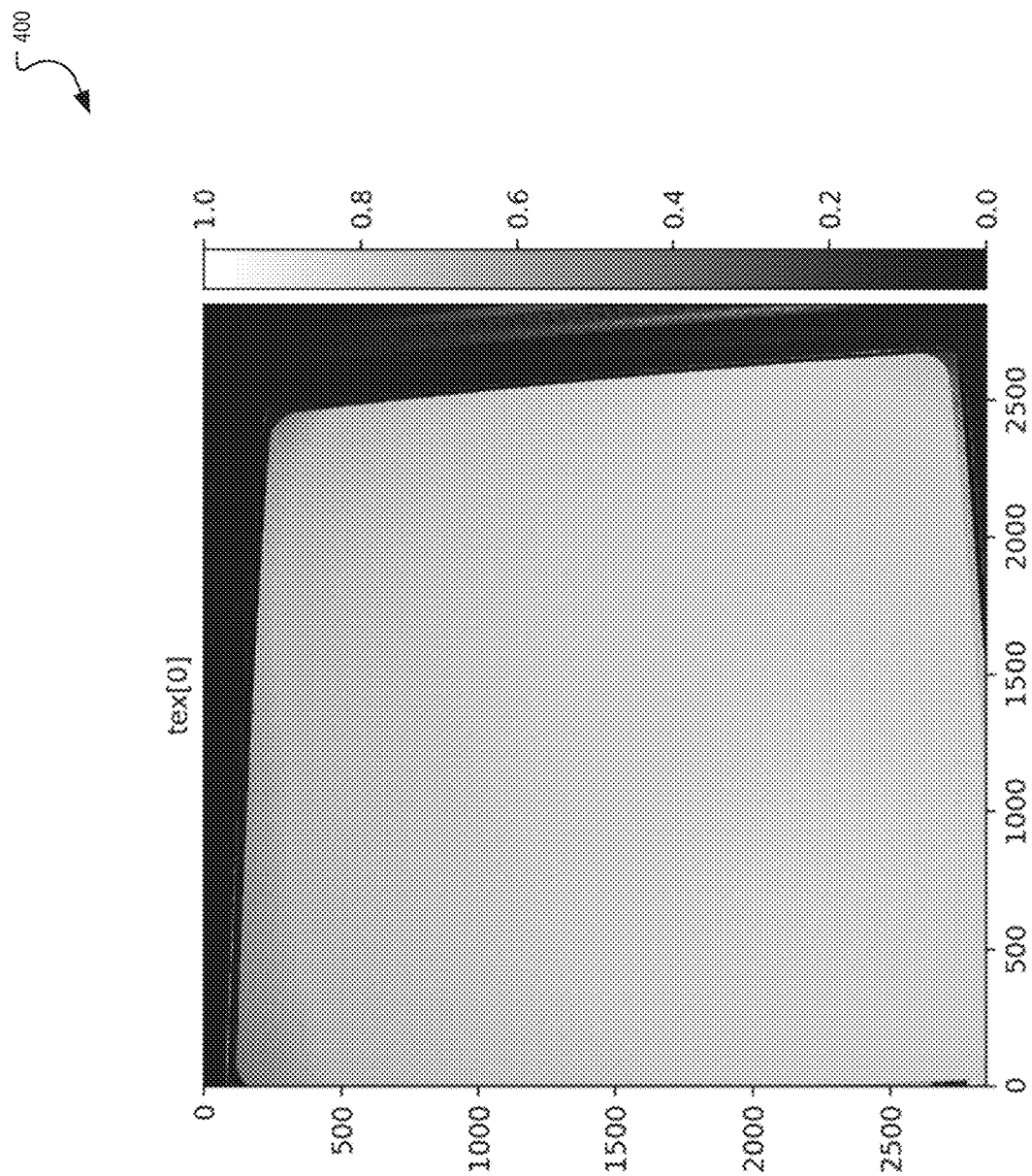
FIG. 4 is a calibration artifact in an initial pose according to an example of the instant disclosure.

FIG. 4 is a calibration artifact in an initial pose 400 according to an example of the instant disclosure.

Figure 5:
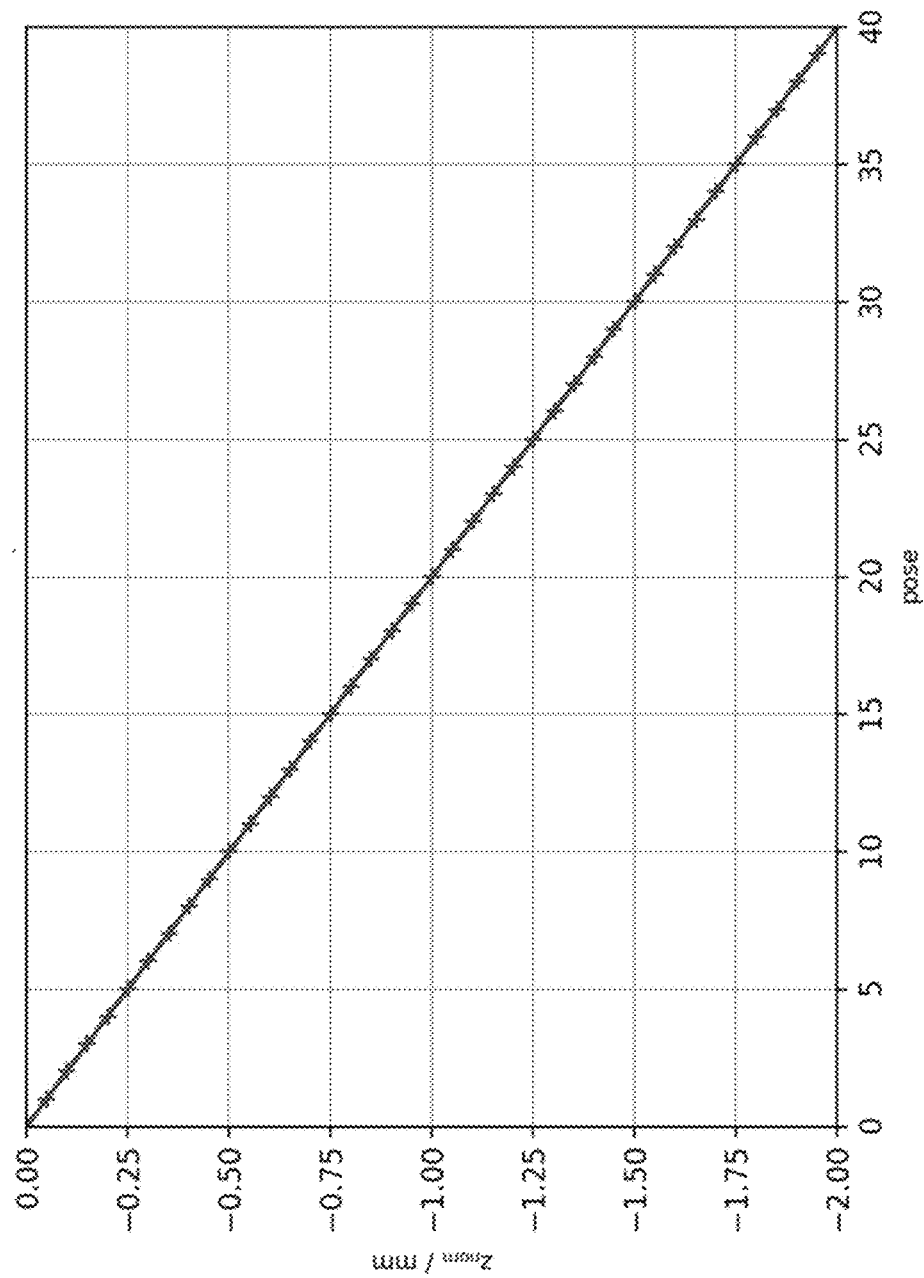
FIG. 5 is a graph showing example poses according to an example of the instant disclosure.

FIG. 5 is a graph showing example poses 500 according to an example of the instant disclosure.

Figure 6:
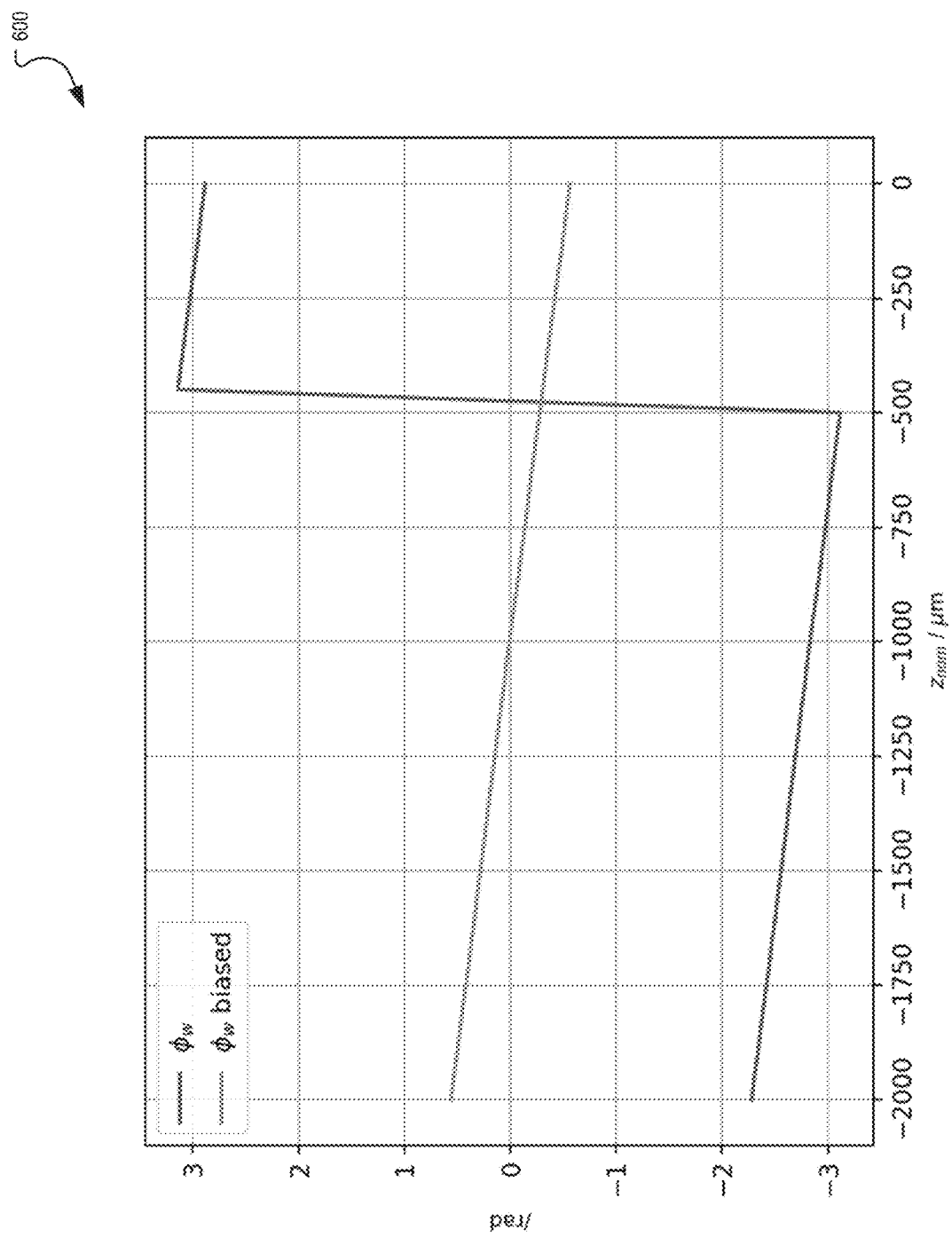
FIG. 6 is a graph showing an example wrapped phase plotted against a nominal height for each pose according to an example of the instant disclosure.

FIG. 6 is a graph 600 showing an example wrapped phase plotted against a nominal height for each pose according to an example of the instant disclosure.

Figure 7:
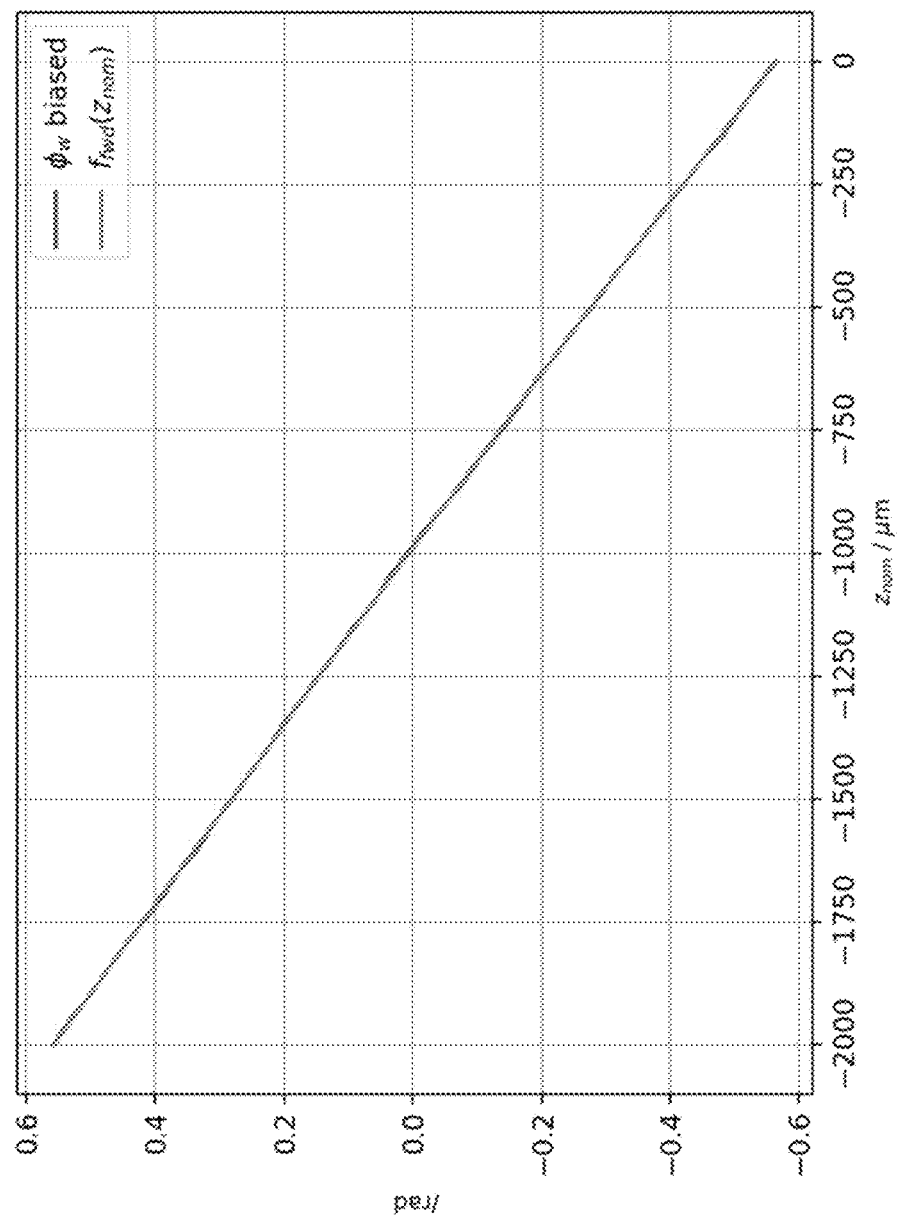
FIG. 7 is a graph showing $f_{fwd}(z_{nom})$ evaluated at $[x,y]=[1000, 1000]$ according to an example of the instant disclosure.

FIG. 7 is a graph 700 showing $f_{fwd}(z_{nom})$ evaluated at [x,y] [1000, 1000] according to an example of the instant disclosure.

Figure 8:
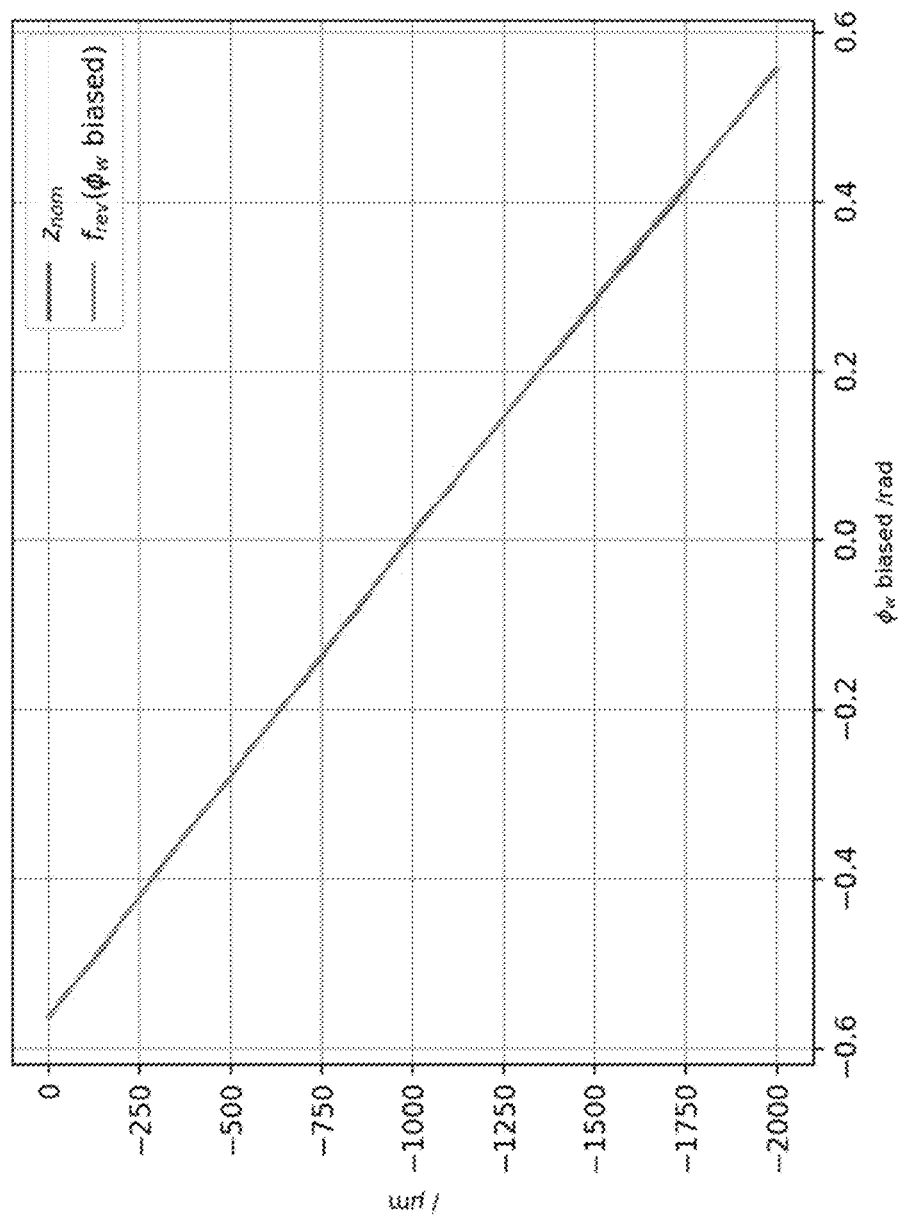
FIG. 8 is a graph showing $f_{rev}(\phi_w$ biased) evaluated at $[x,y]=[1000, 1000]$ according to an example of the instant disclosure.

FIG. 8 is a graph 800 showing $f_{rev}(\phi_w$ biased) evaluated at [x,y]=[1000, 1000] according to an example of the instant disclosure.

As an example, the system 100 may perform calibration of function to map phase estimate $\phi_w$ to height estimate $z_{est}$.

There may be a number of steps to calibrate the system and enable estimation of power bed height $z_{est}$.

As an example, there may be the following assumptions:

A sequence of N poses ("pose 1.p" . . . "pose N.p") may be determined in which a planar calibration artefact has been swept through the measurement volume from top to bottom parallel to the z-axis, and the nominal height $z_{nom}$ of each pose is known.

The calibration artefact lies normal to the z-axis in all pose positions.

The number of poses N can be sufficient to characterize any non-linearity in optical transfer function. N may be at least two, but typically N is >40 and the $\Delta z_{nom}$ step between poses is 50 m, corresponding to >2 mm measurement volume extent along the z-axis.

Further, for a given camera pixel, it is possible to assume that a relationship between estimated wrapped phase $\phi_w$ and height $z_{est}$ can be characterized by a function $z_{est}=f((\phi_w))$. The calibration process therefore aims to optimize the function parameters to fit the observed data.

As an example, FIG. 4 shows a calibration artefact in the initial pose with nominal height $z_{nom}=0$.

Calibration parameters may be defined in an example file config.yaml, which may define the reference and object plane information, masking parameters, contrast limits, number of reference measurements, phase and height bias, or others.

In one example, the folder may have 41 poses, corresponding to linearly spaced artefact positions.

$z_{nom}=[0, -50, -100, \ldots, 2000]$ m is illustrated in FIG. 5.

In one example, FIG. 5 shows a Plot of $z_{nom}$ against pose index.

As an example, it is possible to consider a single pixel [x,y]=[1000, 1000].

FIG. 6 shows an example of estimated wrapped phase $\phi_w$ plotted against the nominal height $z_{nom}$ for each pose, evaluated at [x,y]=[1000, 1000].

Note that the wrapped phase $\phi_w$ may wrap around between the principal phase range limits $-\pi$ and $+\pi$ rad.

Step 1: A first processing step may include determining the constant phase bias at each pixel that shifts the observed ($\phi w$ wrapped phase values such that they are centered around zero. As an example, this may be based on the formula: $\phi_w$ biased=$f_{fwd}(z_{nom})$ to the observed $\phi_w$ values. The phase bias applied at pixel [x,y]=[1000, 1000] is $\phi_w$ biased=$\phi_w - \phi_{bias}$, where $\phi_{bias}=2.84$ rad as illustrated in FIG. 6. This ensures that the $\phi_w$ biased values are monotonic through the work volume.

Step 2: For each pixel, it is possible to fit a $3^{rd}$ order polynomial $\phi_w$ biased=$f_{fwd}(z_{nom})$ to the observed values.

For example, at [x,y]=[1000, 1000] the $f_{fwd}$ coefficients are

[−0.00238102, −0.01658108, −0.58473124, −0.56542734], corresponding to the cubic, quadratic, linear, and constant terms, respectively.

As shown in FIG. 7, the plot shows $f_{fwd}(z_{nom})$ evaluated at [x,y]=[1000, 1000].

Step 3: Having determined the forward polynomial $f_{fwd}$, invert the function to determine the $3^{rd}$ order polynomial $z_{nom}=f_{rev}(\phi_w$ biased).

For example, at [x,y]=[1000, 1000] the $f_{rev}$ coefficients are [−0.02776195, −0.05832995, −1.7752676, −0.98898422], corresponding to the cubic, quadratic, linear, and constant terms, respectively.

As shown in FIG. 8, the graph shows $f_{rev}(\phi_w$ biased) evaluated at [x,y]=[1000, 1000].

Step 4: Having found the phase bias $\phi_w$ biased and polynomial coefficients for the $f_{rev}(\phi_w$ biased) function at each pixel, the information is obtained to estimate height $z_{est}$ from estimated wrapped phase $\phi_w$ using the formula $z_{est}=f(\phi_w)$, where $$z_{est}(x,y)=f_{rev}(\phi_w(x,y)-(\phi_{bias}(x,y))$$

So, considering pixel at [x,y]=[1000, 1000], the calibration coefficients stored are as follows:

$\phi_{bias}$ =2.84 rad, $f_{rev}($ $)$ coefficients= [−0.02776195, −0.05832995, −1.7752676, −0.98898422].

Figure 9:
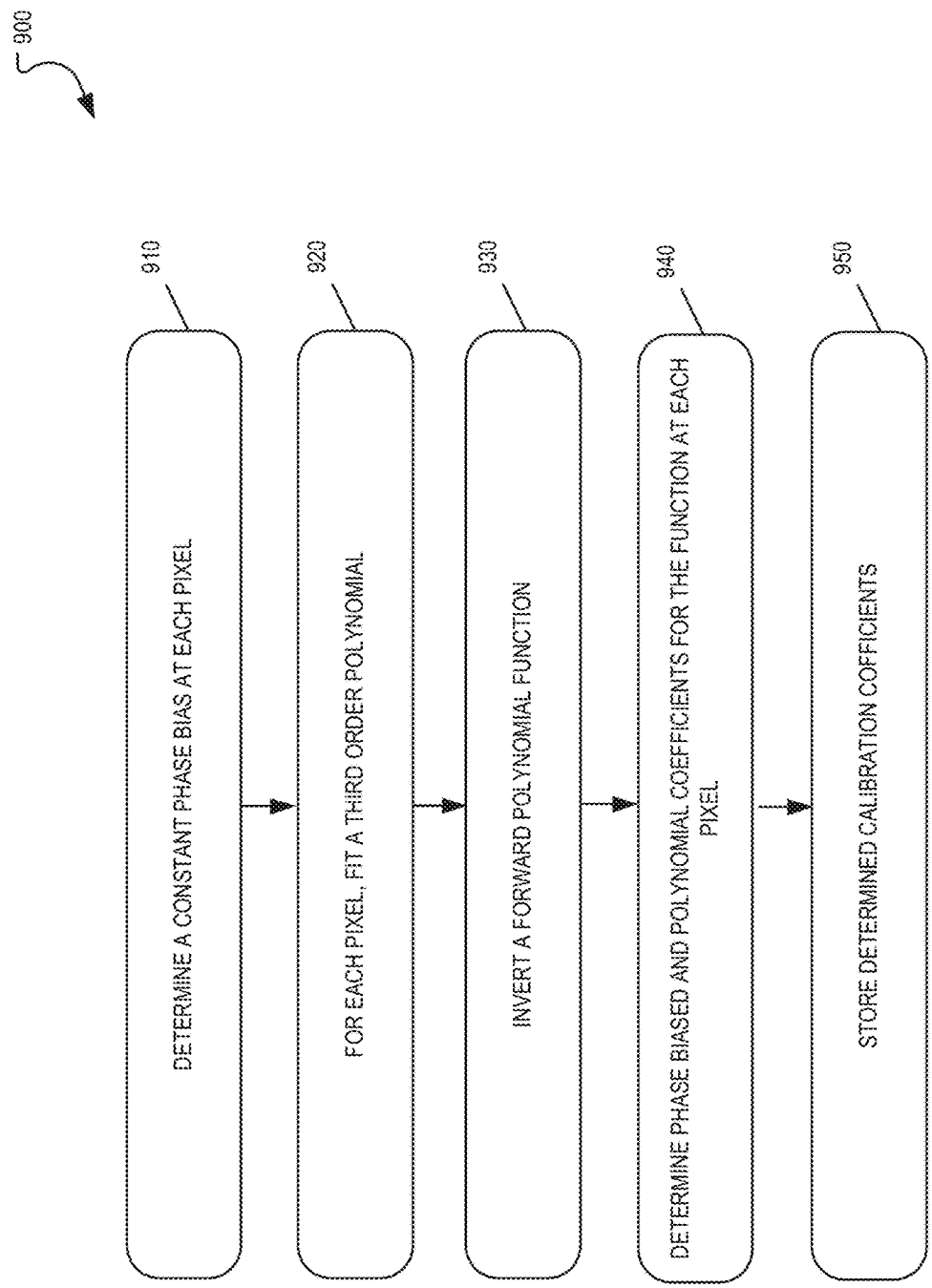
FIG. 9 is a flowchart of a process for software calibration by the fringe calibration system according to an example of the instant disclosure.

FIG. 9 illustrates an example method 900 for software calibration by the fringe calibration system 100 and the fringe calibration application 206 according to an example of the instant disclosure. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method 900 includes determining a constant phase bias at each pixel that shifts observed wrapped phase values such that they are centered around zero at block 910. As an example, this may include determining a constant phase bias at each pixel in an image that shifts observed $\phi_w$ phase values to achieve physical location of pixels. As an example, this may be based on the formula: $\phi_w$ biased=$f_{fwd}(z_{nom})$ to the observed $\phi_w$ values.

According to some examples, the method 900 includes fitting one of a second order and a third order polynomial for each pixel at block 920. As an example, this may include finding one mathematical surface to match the observed phase or height values.

According to some examples, the method 900 includes inverting a function to determine the third order polynomial at block 930. As an example, this may include determining a forward polynomial function $f_{fwd}$ and inverting the $f_{fwd}$ function to determine a third order polynomial $z_{nom}=f_{rev}(($\phi w$ biased).

According to some examples, the method 900 includes determining calibration coefficients at block 940. As an example, this may include determining phase bias $\phi_w$ biased and polynomial coefficients for the $f_{rev}(\phi_w$ biased) function at each pixel in one of a two-dimensional area and a three-dimensional volume and estimating height values from estimated phase using a developed formula for each pixel in a measurement area or measurement volume. This may be done using a formula such as $z_{est}=f(\phi_w)$, where $z_{est}(x,y)=f_{rev}(\phi_w(x,y)-(\phi_{bias}(x,y))$.

According to some examples, the method 900 includes storing the calibration coefficients in storage such as the database 210 at block 950. As an example, this may include storing information associated with the phase bias $\phi_w$ biased and polynomial coefficients for the $f_{rev}(\phi_w$ biased) function at each pixel.

Figure 10:
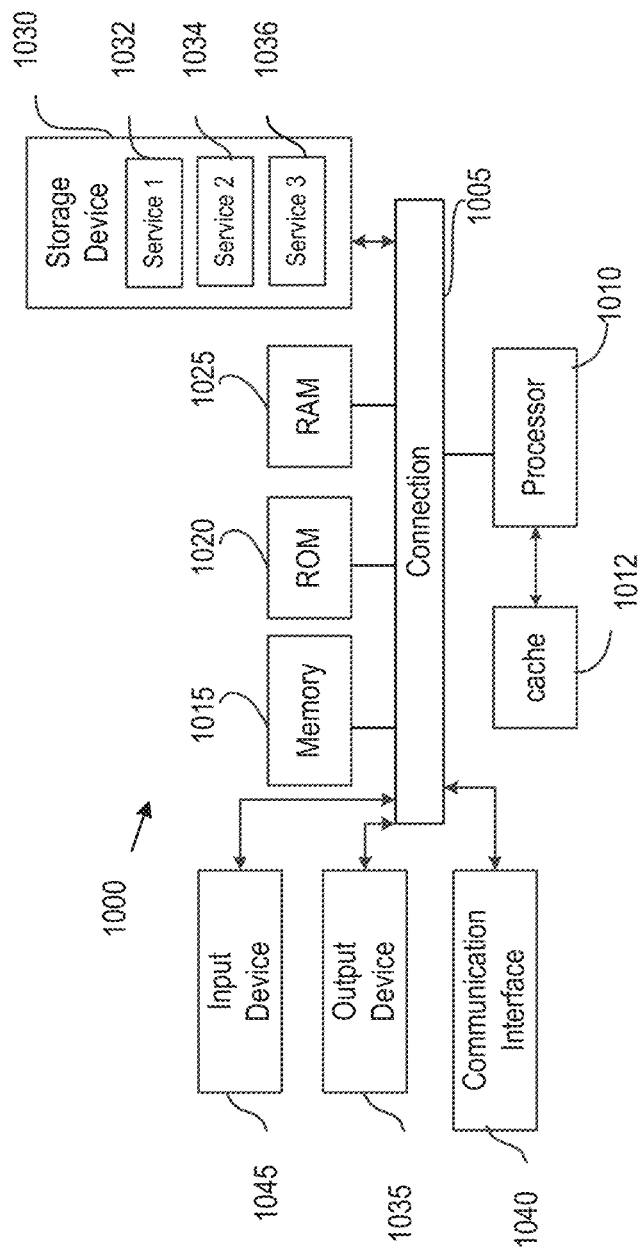
FIG. 10 shows an example of a system for implementing certain aspects of the present technology.

FIG. 10 shows an example of computing system 1000, which can be, for example, the computing device 202, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising an additive manufacturing machine having a reference surface and an object surface, at least one camera device to capture the reference surface, at least one projector device to project at the reference surface, a memory storing computer-readable instructions, and at least one processor to execute the instructions to move the reference surface above or below a highest point of the object surface, and move the reference surface and obtain a digital fringe projection phasemap of the reference surface using the at least one camera device and the at least one projector device until a whole measurement volume has phasemap data.

Aspect 2: The system of Aspect 1, wherein the reference surface comprises at least one of a powder surface, a melted surface, a binded surface, a slurry surface, a baseplate, and a calibration plate.

Aspect 3: The system of Aspects 1 and 2, wherein the object surface comprises at least one of a powder surface, a melted surface, a binded surface, a slurry surface, a baseplate, and a calibration plate.

Aspect 4: The system of Aspects 1 to 3, wherein at least one of focus, aperture, exposure, gain, and brightness is tuned for the at least one camera device and the at least one projector device.

Aspect 5: The system of Aspects 1 to 4, the at least one processor further to preheat a printing volume of the additive manufacturing machine to a temperature and a pressure before the measurement volume has phasemap data.

Aspect 6: The system of Aspects 1 to 5, the at least one processor further to determine a constant phase bias at each pixel in an image that shifts observed ($P_w$ phase values to achieve physical location of pixels.

Aspect 7: The system of Aspects 1 to 6, the at least one processor further to find one mathematical surface to match the observed phase or height values.

Aspect 8: The system of Aspects 1 to 7, the at least one processor further to determine a forward polynomial function $f_{fwd}$ and invert the $f_{fwd}$ function to determine a third order polynomial $z_{nom}=f_{rev}((\phi w$ biased).

Aspect 9: The system of Aspects 1 to 8, the at least one processor further to determine phase bias $\phi_w$ biased and polynomial coefficients for the $f_{rev}((\phi_w$ biased) function at each pixel in one of a two-dimensional area and a three-dimensional volume and estimate height values from estimated phase using a developed formula for each pixel in the measurement volume.

Aspect 10: The system of Aspects 1 to 9, the at least one processor further to store information associated with the phase bias $\phi_w$ biased and polynomial coefficients for the $f_{rev}(\phi_w$ biased) function at each pixel.

Aspect 11: A method comprising capturing a reference surface of an additive manufacturing machine by at least one camera device, using at least one projector device to project at the reference surface of the additive manufacturing machine, moving, by at least one processor, the reference surface above or below a highest point of an object surface of the additive manufacturing machine, and moving, by the at least one processor, the reference surface and obtaining a digital fringe projection phasemap of the reference surface using the at least one camera device and the at least one projector device until a whole measurement volume has phasemap data.

Aspect 12: The method of Aspect 11, wherein the reference surface comprises at least one of a powder surface, a melted surface, a binded surface, a slurry surface, a baseplate, and a calibration plate.

Aspect 13: The method of Aspects 11 and 12, wherein the object surface comprises at least one of a powder surface, a melted surface, a binded surface, a slurry surface, a baseplate, and a calibration plate.

Aspect 14: The method of Aspects 11 to 13, wherein at least one of focus, aperture, exposure, gain, and brightness is tuned for at the least one camera device and the at least one projector device.

Aspect 15: The method of Aspects 11 to 14, further comprising preheating a printing volume of the additive manufacturing machine to a temperature and a pressure before the measurement volume has phasemap data.

Aspect 16: The method of Aspects 11 to 15, further comprising determining a constant phase bias at each pixel in an image that shifts observed ex phase values to achieve physical location of pixels.

Aspect 17: The method of Aspects 11 to 16, further comprising finding one mathematical surface to match the observed phase or height values.

Aspect 18: The method of Aspects 11 to 17, further comprising determining a forward polynomial function $f_{fwd}$ and inverting the $f_{fwd}$ function to determine a third order polynomial $z_{nom}=f_{rev}(\phi_w$ biased).

Aspect 19: The method of Aspects 11 to 18, further comprising determining phase bias $\phi_w$ biased and polynomial coefficients for the $f_{rev}(\phi_w$ biased) function at each pixel in one of a two-dimensional area and a three-dimensional volume and estimating height $z_{est}$ from estimated wrapped phase $\phi_w$ using a developed formula for each pixel in the measurement volume.

Aspect 20: The method of Aspects 11 to 19, further comprising storing information associated with the phase bias $\phi_w$ biased and polynomial coefficients for the $f_{rev}(\phi_w$ biased) function at each pixel.

Aspect 21: A non-transitory computer-readable storage medium, having instructions stored thereon that, when executed by at least one computing device cause the at least one computing device to perform operations, the operations comprising capturing a reference surface of an additive manufacturing machine by at least one camera device, using at least one projector device to project at the reference surface of the additive manufacturing machine, moving the reference surface above or below a highest point of an object surface of the additive manufacturing machine, and moving the reference surface and obtaining a digital fringe projection phasemap of the reference surface using the at least one camera device and the at least one projector device until a whole measurement volume has phasemap data.

What is claimed is:

1. A system comprising:
    an additive manufacturing machine having a reference surface and an object surface;
    at least one camera device to capture the reference surface;
    at least one projector device to project at the reference surface;
    a memory storing computer-readable instructions; and
    at least one processor to execute the instructions to:
    move the reference surface above or below a highest point of the object surface;
    move the reference surface and obtain a digital fringe projection phasemap of the reference surface using the at least one camera device and the at least one projector device until a whole measurement volume has phasemap data; and
    determine a constant phase bias at each pixel in an image that shifts observed $\phi_w$ phase values to achieve physical location of pixels.

2. The system of claim 1, wherein the reference surface comprises at least one of a powder surface, a melted surface, a binded surface, a slurry surface, a baseplate, and a calibration plate.

3. The system of claim 1, wherein the object surface comprises at least one of a powder surface, a melted surface, a binded surface, a slurry surface, a baseplate, and a calibration plate.

4. The system of claim 1, wherein at least one of focus, aperture, exposure, gain, and brightness is tuned for the at least one camera device and the at least one projector device.

5. The system of claim 1, the at least one processor further to execute the instructions to preheat a printing volume of the additive manufacturing machine to a temperature and a pressure before the measurement volume has phasemap data.

6. The system of claim 1, the at least one processor further to execute the instructions to find one mathematical surface to match the observed phase or height values.

7. The system of claim 6, the at least one processor further to execute the instructions to determine a forward polynomial function $f_{fwd}$ and invert the $f_{fwd}$ function to determine a third order polynomial $z_{nom}=f_{rev}(\phi_w$ biased).

8. The system of claim 7, the at least one processor further to execute the instructions to determine phase bias $\phi_w$ biased and polynomial coefficients for the $f_{rev}(\phi_w$ biased) function at each pixel in one of a two-dimensional area and a three-dimensional volume and estimate height values from estimated phase using a developed formula for each pixel in the measurement volume.

9. The system of claim 8, the at least one processor further to execute the instructions to store information associated with the phase bias $\phi_w$ biased and polynomial coefficients for the $f_{rev}(\phi_w$ biased) function at each pixel.

10. A method, comprising:
capturing a reference surface of an additive manufacturing machine by at least one camera device;
using at least one projector device to project at the reference surface of the additive manufacturing machine;
moving, by at least one processor, the reference surface above or below a highest point of an object surface of the additive manufacturing machine;
moving, by the at least one processor, the reference surface and obtaining a digital fringe projection phasemap of the reference surface using the at least one camera device and the at least one projector device until a whole measurement volume has phasemap data; and
determining a constant phase bias at each pixel in an image that shifts observed $\phi_w$ phase values to achieve physical location of pixels.

11. The method of claim 10, wherein the reference surface comprises at least one of a powder surface, a melted surface, a binded surface, a slurry surface, a baseplate, and a calibration plate.

12. The method of claim 10, wherein the object surface comprises at least one of a powder surface, a melted surface, a binded surface, a slurry surface, a baseplate, and a calibration plate.

13. The method of claim 10, wherein at least one of focus, aperture, exposure, gain, and brightness is tuned for at the least one camera device and the at least one projector device.

14. The method of claim 10, further comprising preheating a printing volume of the additive manufacturing machine to a temperature and a pressure before the measurement volume has phasemap data.

15. The method of claim 10, further comprising finding one mathematical surface to match the observed phase or height values.

16. The method of claim 15, further comprising determining a forward polynomial function $f_{fwd}$ and inverting the $f_{fwd}$ function to determine a third order polynomial $z_{nom}=f_{rev}(\phi_w$ biased).

17. The method of claim 16, further comprising determining phase bias ep biased and polynomial coefficients for the $f_{rev}(\phi_w$ biased) function at each pixel in one of a two-dimensional area and a three-dimensional volume and estimating height $z_{est}$ from estimated wrapped phase $\phi_w$ using a developed formula for each pixel in the measurement volume.

18. The method of claim 17, further comprising storing information associated with the phase bias $\phi_w$ biased and polynomial coefficients for the $f_{rev}((\phi_w$ biased) function at each pixel.

19. A non-transitory computer-readable storage medium, having instructions stored thereon that, when executed by at least one computing device cause the at least one computing device to perform operations, the operations comprising:
capturing a reference surface of an additive manufacturing machine by at least one camera device;
using at least one projector device to project at the reference surface of the additive manufacturing machine;
moving the reference surface above or below a highest point of an object surface of the additive manufacturing machine;
moving the reference surface and obtaining a digital fringe projection phasemap of the reference surface using the at least one camera device and the at least one projector device until a whole measurement volume has phasemap data; and
determining a constant phase bias at each pixel in an image that shifts observed ($\phi_w$ phase values to achieve physical location of pixels.

* * * * *